United States Patent
Shinkle et al.

(10) Patent No.: US 10,037,026 B2
(45) Date of Patent: Jul. 31, 2018

(54) SYSTEMS AND METHODS FOR FAULT ANALYSIS

(71) Applicant: General Electric Company, Schenectady, NY (US)

(72) Inventors: William Randolph Shinkle, Cincinnati, OH (US); Hardev Singh, Cincinnati, OH (US); David Michael Boudreaux, West Chester, OH (US)

(73) Assignee: General Electric Company, Schenectady, NY (US)

(*) Notice: Subject to any disclaimer, the term of this patent is extended or adjusted under 35 U.S.C. 154(b) by 728 days.

(21) Appl. No.: 14/497,156

(22) Filed: Sep. 25, 2014

(65) Prior Publication Data

US 2016/0091397 A1    Mar. 31, 2016

(51) Int. Cl.
*G01M 99/00* (2011.01)
*G05B 23/02* (2006.01)
*G06F 17/18* (2006.01)

(52) U.S. Cl.
CPC .......... *G05B 23/0232* (2013.01); *G06F 17/18* (2013.01)

(58) Field of Classification Search
CPC ............ G05B 23/0232; G05B 23/0283; G05B 23/024; G05B 23/0278; G06F 17/18
See application file for complete search history.

(56) References Cited

U.S. PATENT DOCUMENTS

| | | | |
|---|---|---|---|
| 5,748,500 A * | 5/1998 | Quentin | G07C 3/00 702/182 |
| 6,301,531 B1 | 10/2001 | Pierro et al. | |
| 6,532,433 B2 | 3/2003 | Bharadwaj et al. | |
| 6,843,060 B2 | 1/2005 | Gallant et al. | |
| 6,871,487 B2 | 3/2005 | Kurtz et al. | |
| 6,917,839 B2 | 7/2005 | Bickford | |
| 7,035,763 B2 | 4/2006 | Yuan et al. | |
| 7,089,154 B2 | 8/2006 | Rasmussen et al. | |
| 7,096,159 B2 | 8/2006 | Cataltepe et al. | |
| 7,142,990 B2 | 11/2006 | Bouse et al. | |
| 7,159,401 B1 | 1/2007 | Kurtz et al. | |
| 7,251,582 B2 | 7/2007 | Singh et al. | |
| 7,788,209 B2 | 8/2010 | Paquet et al. | |
| 7,949,497 B2 | 5/2011 | Yuan et al. | |
| 8,155,820 B2 | 4/2012 | Eklund et al. | |
| 8,352,152 B2 | 1/2013 | Serres | |
| 2004/0030524 A1* | 2/2004 | Jarrell | G05B 23/0283 702/113 |
| 2006/0241910 A1* | 10/2006 | Petchenev | G05B 23/0283 702/184 |
| 2008/0201104 A1* | 8/2008 | Poncet | G05B 23/0229 702/181 |
| 2010/0269481 A1* | 10/2010 | Snider | F02C 9/00 60/39.24 |

(Continued)

FOREIGN PATENT DOCUMENTS

WO    9634207    10/1993

*Primary Examiner* — John Breene
*Assistant Examiner* — Mohammad Islam
(74) *Attorney, Agent, or Firm* — Fletcher Yoder, P.C.

(57) ABSTRACT

A system, includes machinery; and a protection monitoring system, comprising a processor configured to: analyze a trend of one or more data measurements of the machinery for one or more patterns indicative of a potential future fault within the machinery in the trend; and provide a fault prediction based upon the analysis of the trend.

17 Claims, 6 Drawing Sheets

(56) References Cited

U.S. PATENT DOCUMENTS

| | | | | |
|---|---|---|---|---|
| 2010/0312188 A1* | 12/2010 | Robertson | ............ | A61B 5/0006 604/156 |
| 2011/0313726 A1* | 12/2011 | Parthasarathy | ...... | G05B 23/024 702/179 |
| 2012/0226474 A1* | 9/2012 | Trejo Sanchez | ... | G05B 23/0275 702/179 |
| 2013/0024416 A1* | 1/2013 | Herzog | .............. | G05B 23/0283 706/52 |
| 2013/0046507 A1* | 2/2013 | Vega Paez | .............. | F01D 21/00 702/179 |
| 2013/0069792 A1* | 3/2013 | Blevins | .................. | G05B 17/02 340/815.4 |
| 2013/0274898 A1 | 10/2013 | Thatikonda et al. | | |
| 2014/0365036 A1* | 12/2014 | Moeckly | ................... | F02C 9/00 701/3 |
| 2015/0377745 A1* | 12/2015 | Al-Najjar | ............ | G05B 23/024 702/183 |

\* cited by examiner

US 10,037,026 B2

SYSTEMS AND METHODS FOR FAULT ANALYSIS

BACKGROUND

The subject matter disclosed herein relates to gas turbine industrial control systems and, more specifically, to system-level failure prediction in the industrial control system.

Certain systems, such industrial control systems, may provide for control capabilities that enable the execution of control instructions in various types of devices, such as sensors, pumps, valves, and the like. Additionally, certain industrial control systems may include one or more graphical user interfaces that may be used to present details to an operator about the various devices present on the control system network. For example, a graphical user interface may present an operator with alerts that may contain alarm or diagnostic information about a device on the control system network.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system, includes: machinery; and a protection monitoring system, comprising a processor configured to: analyze a trend of one or more data measurements of the machinery for one or more patterns indicative of a potential future fault within the machinery in the trend; and provide a fault prediction based upon the analysis of the trend.

In a second embodiment, a tangible, non-transitory, machine-readable medium, includes instructions to: obtain data measurement trends related to one or more characteristics of a piece of machinery; analyze the data measurement trends to identify one or more patterns indicative of a potential future fault within the machinery; and provide a fault prediction based upon the analysis of the trend.

In a third embodiment, a method includes: predicting, via a computer processor, a potential machinery fault by: obtaining data measurement trends related to one or more characteristics of the machinery; analyzing the data measurement trends to identify one or more patterns indicative of a potential future fault within the machinery; and providing a fault prediction based upon the analysis of the trend.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
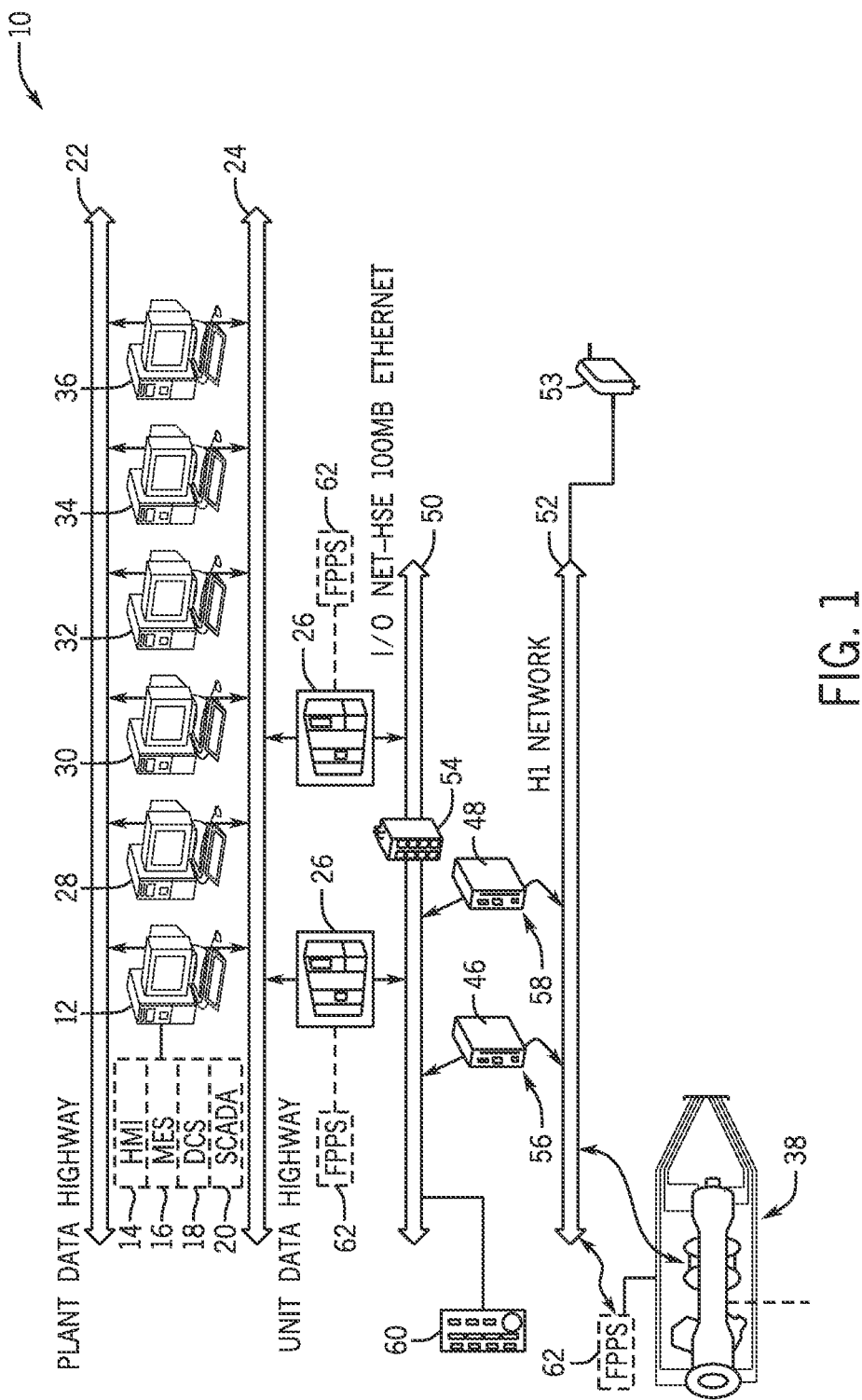
FIG. 1 is a schematic diagram of an industrial control system, including fault prediction/protection system, in accordance with an embodiment.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three, or more industrial controllers for redundancy. The industrial controllers 26 may enable control logic useful in automating a variety of plant equipment, such as a turbine system 38. Indeed, the industrial controllers 26 may communicate with a variety of devices, including but not limited to temperature sensors, flow meters, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38 is communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

A variety of devices may be linked to the industrial controller 26 and to the computer 12. For example, the devices, such as the turbine system 38, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the turbine 38, as well as for enabling communications between the turbine 38 and other devices of the system 10. Advantageously, the H1 network 52 may carry both power and communications signals (e.g., alert signals) over the same wiring, with minimal communicative interference. The turbine 38 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the turbine 38, while the linking device 48 may use the segment port 58 to communicatively couple with the other devices of the system 10. Distributing the input/output between the turbine 38 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

The system 10 may include one or more fault prediction/protection systems 62, which may act to predict future faults within the industrial control system 10 and/or provide control of the industrial control system 10 to prevent future faults. For example, as will be discussed in more detail below, the fault prediction/protection systems 62 may predict and/or prevent turbine 38 stalls utilizing data obtained from sensors of the turbine 38. To do this, the fault prediction/protection systems 62 may be communicatively coupled with the turbine system 38 (e.g., via direct data acquisition of sensors of the turbine system 38 or via coupling to other components (e.g., one or more controller(s) 26 in communication with the turbine system 38). Upon predicting a future fault, the fault prediction/protection systems 62 may provide a notification (e.g., trigger an alarm or alert) and/or may take other preventative measures, such as controlling one or more operations of the turbine system 38.

Figure 2:
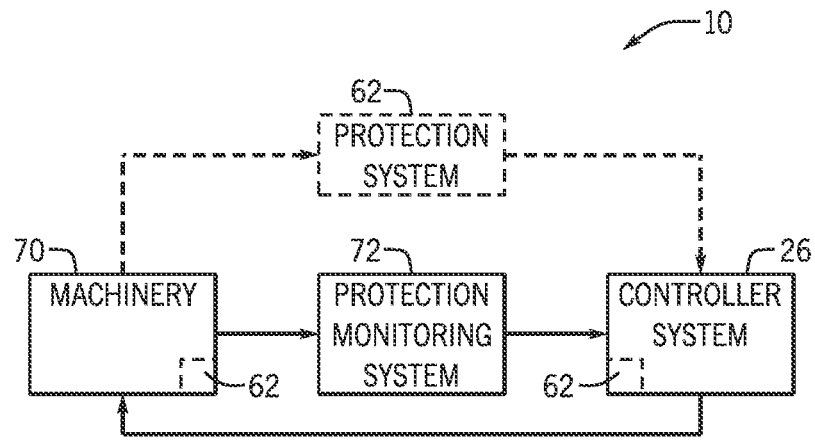
FIG. 2 is a schematic diagram of an industrial control system, including a system-level fault prediction/protection system, in accordance with an embodiment.

As mentioned above, the fault prediction/protection system 62 is communicatively coupled to the system (e.g., turbine system 38) that it is tasked with monitoring. FIG. 2 illustrates a high-level view of the control system 10 that may be automated for prediction and/or protection of faults. As illustrated in FIG. 2, the fault prediction/protection system may be distributed in one or more areas of the control system 10.

The illustrated industrial control system 10 includes machinery 70, a protection monitoring system 72, and a controller system 26. In other embodiments, the industrial automation system 10 may include additional devices, such as monitoring devices. As illustrated, the fault prediction/protection system 62 may include machine-readable instructions stored on a tangible, non-transitory, machine-readable medium, which may be standalone or integrated into one of the components of the control system 10 (e.g., the machinery 70 and/or the controller 26).

Furthermore, certain embodiments of the industrial control system 10 may include the fault prediction/protection system 62 integrated into the machinery 70 and/or the controller 26. In some embodiments, the fault prediction/protection system 62 may be separate and distinct from other portions of the industrial automation system 10.

The fault prediction/protection system 62 constrains the controller 26 to operate the machinery 70 to achieve desired goals within various constraints on the machinery 70. In other words, controller 26 and/or the fault prediction/protection system 62 may be used to protect the machinery 70 from damage due to operating parameters varying beyond tolerable levels. For example, in certain embodiments, the controller 26 may include a MARK® VI or MARK® VIe controller by General Electric® of Schenectady, N.Y. In some embodiments, the protection monitoring system 72 may include a protection monitoring system similar to a 3500 Series Machinery Protection System with Bently Nevada™ Asset Condition Monitoring also made available by General Electric® of Schenectady, N.Y. The machinery 70 may include mechanically functioning parts of the industrial automation system 10 or subsystem (e.g., the turbine system 38). For example, the machinery may include engines, compressors, combustors, conveyer belts, generators, inlet guide vanes (IGV), pumps, turbo expanders, etc. In embodiments where the industrial control system 10 includes the gas turbine system 38, the machinery 70 may include a turbine and/or other mechanically functioning parts (e.g., compressor).

Additionally, the fault prediction/protection system 62 may include various system diagnostic and monitoring devices (e.g., sensors, transducers, interconnections therebetween, etc.). The protection monitoring system 72 monitors functionality and connectivity of the fault prediction/protection system 62. In other words, the protection monitoring system 72 verifies that the machinery 70 is being protected correctly by the protection system 62. In some embodiments, the fault prediction/protection system 62 may include the protection monitoring system 72 essentially integrated into one system that protects the machinery 70 and monitors the status of the protection. In certain embodiments, the protection monitoring system 72 may be implemented using software stored on a computing device (e.g., electronic device having a processor). For example, in some embodiments, the protection monitoring system 72 may be stored as instructions stored on a computer readable medium, such as a memory, a disk drive, an optical drive, or other type of storage. In certain embodiments, these instructions may be stored and/or executed by the controller 26, an operator machine, or a remote server. In other embodiments, the protection monitoring system 72 may be implemented using hardware circuitry. For example, in some embodiments, the protection monitoring system 72 may located in a housing enclosing the controller 26. As discussed below, if the protection monitoring system 72 determines that fault prediction/protection system 62 has faulted, the protection monitoring system 72 may address the fault and/or alert a user/operator to indicate that the machinery 70 is not protected.

Figure 3:
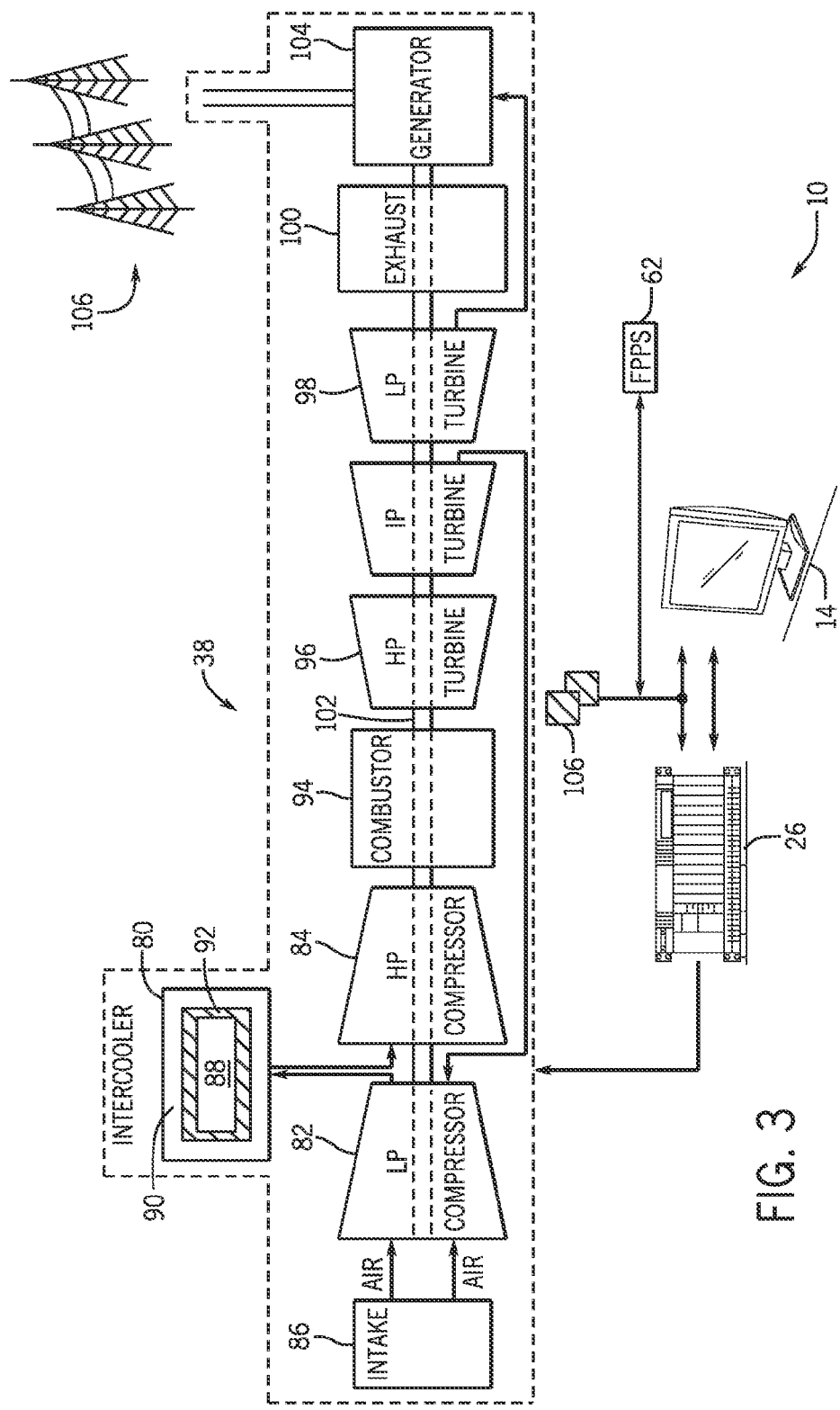
FIG. 3 is a schematic drawing of an industrial control system having a turbine system that includes a fault prediction/protection system, in accordance with an embodiment.

FIG. 3 illustrates an embodiment of control system 10 including a more detailed view of the turbine system 38. The turbine system 38 may be used to provide power, such as electrical and/or mechanical power. Certain of the turbine systems 38, such as the LMS100 turbine system 38 available from General Electric Co., of Schenectady, N.Y., may include an intercooler 80. It is to be understood that the turbine system 38 may be any turbine system designed to convert fuel into a rotative power. Accordingly, different arrangements of turbine components may be used, and FIG. 3 describes a representative example. The intercooler 80 may increase the efficiency of the turbine system 38, for example, by cooling a hot fluid (e.g., compressed air) directed from a low pressure (LP) compressor 82, and directing the cooled fluid (e.g., compressed air) into a high pressure (HP) compressor 84. For example, a fluid, such as air, may enter an intake 86 and become compressed by the LP compressor 82. The air compressed by the LP compressor 82 may gain thermal energy (i.e., heat) during compression. For example, the compressed air may be at a temperature of approximately between 50° to 300° Celsius. The higher temperature air may then be directed into the intercooler 80. The intercooler 80 may include two chambers, e.g., an inner tube bundle chamber 88 and an outer shell chamber 90. The hot air may enter the outer shell chamber 90, and exchange heat with the cooler inner tube bundle chamber 88, thus reducing the temperature of the hot air. In certain embodiments, the inner tube bundle chamber 88 may flow a cooling fluid, such as water to transfer heat away from the hot air to produce cooler air. The cooler air may then be directed into the HP compressor 84. By cooling the air provided to the HP compressor 84, higher energy efficiencies may be achieved. For example, the cooler air may reduce the work of compression in the HP compressor 84, while increasing mass flow of air into the turbine system 38, thus increasing overall efficiency.

A seal 92 is disposed between the inner tube chamber 88 and the outer shell chamber 90, so as to block fluid flow (e.g., leakage) between both chambers 20 and 22. The chamber 88 and/or 22 may thermally expand and contract, in some cases, exhibiting movement between approximately 0.5 cm and 10 cm. In certain embodiments, the seal 92 may also expand to follow the expansion of the chamber 88, while also maintaining a suitable barrier to fluid flows between the chambers 88 and 90. Indeed, the seal 92 may expand and contract to suitably block fluid flows (e.g., leakage); even in sealed locations having bends or curves, thus improving the overall efficiency of the turbine system 38.

As depicted, the turbine system 38 may include a combustor 94, which receives and combusts a fuel air mixture to generate hot pressurized exhaust gases. The turbine system 38 directs the exhaust gases through a high pressure (HP) turbine 96 and a low pressure (LP) turbine 98 toward an exhaust outlet 100. The HP turbine 96 may be part of a HP rotor. Similarly, the LP turbine 98 may be part of a LP rotor. As the exhaust gases pass through the HP turbine 96 and the LP turbine 98, the gases force turbine blades to rotate a drive shaft 102 along an axis of the turbine system 38. As illustrated, the drive shaft 102 is connected to various components of the turbine system 38, including the HP compressor 84 and the LP compressor 82. It is to be understood that, other turbine systems may include intermediate pressure compressors, intermediate pressure turbines, and other arrangement of component systems, including shaft arrangements and couplings to the generator 104.

The drive shaft 102 may include one or more shafts that may be, for example, concentrically aligned. The drive shaft 102 may include a shaft connecting the HP turbine 96 to the HP compressor 84 to form a HP rotor. The HP compressor 84 may include blades coupled to the drive shaft 102. Thus, rotation of turbine blades in the HP turbine 96 causes the shaft connecting the HP turbine 96 to the HP compressor 84 to rotate blades within the HP compressor 84. This compresses air in the HP compressor 84. Similarly, the IP drive shaft 102 includes a shaft connecting the IP turbine 97 to the LP compressor 82 to form a LP rotor. The LP compressor 82 includes blades coupled to the IP shaft 102. Thus, rotation of turbine blades in the IP turbine 97 causes the shaft connecting the IP turbine 97 to the LP compressor 82 to rotate blades within the LP compressor 82. The compressed air is fed to the combustor 94 and mixed with fuel to allow for higher efficiency combustion. Thus, the turbine system 38 may include a dual concentric shafting arrangement, wherein LP turbine 98 is drivingly connected to generator 104 by drive shaft 103, while the HP turbine 96 is similarly drivingly connected to the HP compressor 84 by a second shaft in the drive shaft 102 internal and concentric to the first shaft. The shaft 102 may also be connected to an electrical generator 104 or any other load, such as a mechanical load. The generator 104 may be connected to an electrical distribution grid 106 suitable for distributing the electricity produced by the generator 104.

As mentioned above, the control system 10 may include one or more sensors 106 used in the monitoring and/or control of the control system 10. For example, in the current embodiment, the turbine system 38 includes a plurality of sensors 106 use to provide operational data relating to one or more components of the turbine system 38 (e.g., the LP compressor 82, the HP compressor 84, the combustor 94, the HP turbine 96, the LP turbine 98, etc.). Data from the sensors 106 may be communicated to the controller 26, HMI 14, and/or the fault prediction/protection system 62 for monitoring and control of the turbine system 38.

As will be described in more detail below, the fault prediction/protection system 62 may use this sensor 106 data to discern the likelihood of a future fault (e.g., a turbine stall, etc.). By predicting faults before they occur, proactive measures may be taken to reduce the likelihood of the actual occurrence of the fault. Accordingly, costly outages may be reduced.

Figure 4:
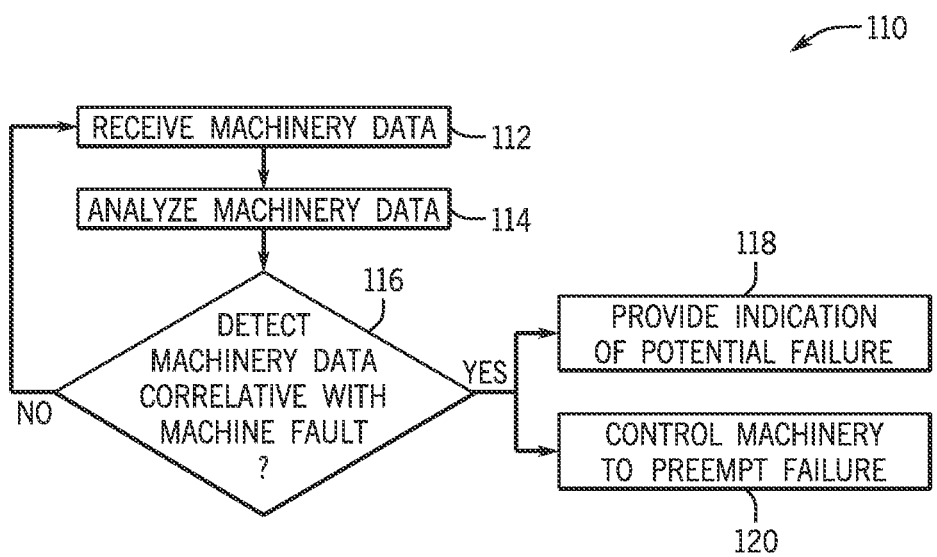
FIG. 4 is a flowchart illustrating a process for issuing control within the industrial control system, based upon a predicted fault, in accordance with an embodiment.

FIG. 4 illustrates an embodiment of a process 110 for protecting a turbine system 38 from a fault (e.g., a trip, shutdown, or runback). First, operational parameters from the machinery are obtained by the fault prediction/protection system 62 (block 112). As mentioned above, this data may be sourced from sensors 106 of the turbine system 38 that are tasked with monitoring parameters of one or more components of the turbine system 38.

The machinery data 114 is analyzed to detect data patterns associated with machinery failure (block 114). For example, in some instances, individual process parameter thresholds may be indicative of a potential machinery fault within the turbine system 38. In some instances, two or more process parameters may be analyzed together to determine a potential machinery fault. Embodiments of particular patterns that may correlate with a potential machinery fault will be described in more detail below.

At decision block 116, if no data correlative with a potential machinery fault is detected, the process 110 returns to block 112 to obtain subsequent machinery data. However, if data correlative with a potential machinery fault is detected, additional notification and/or control may occur. In some embodiments, upon detecting such correlative data, an indication of a potential failure/fault may be provided to an operator of the turbine system 38 (block 118). For example, an alarm or alert may be provided to the computer 30 (of FIG. 1) hosting the alarm server, where an alarm or alert may ultimately be provided to an operator (e.g., via the HMI 14).

Additionally or alternatively, upon detecting data correlative with a potential machinery fault, the control system 10 may control the machinery to preempt the failure (block 120). For example, the controller 26 (of FIG. 1) may operate control components (e.g., electric actuators, Hall switches, solenoid switches, relay switches, limit switches, or other components, to affect one or more operational changes within the turbine system 38. As discussed in more detail below, with regards to FIG. 8, the control system 10 may cause the machinery to shut down prior to a fault, thus protecting the machinery and/or environment from fault-related damage.

Figure 5:
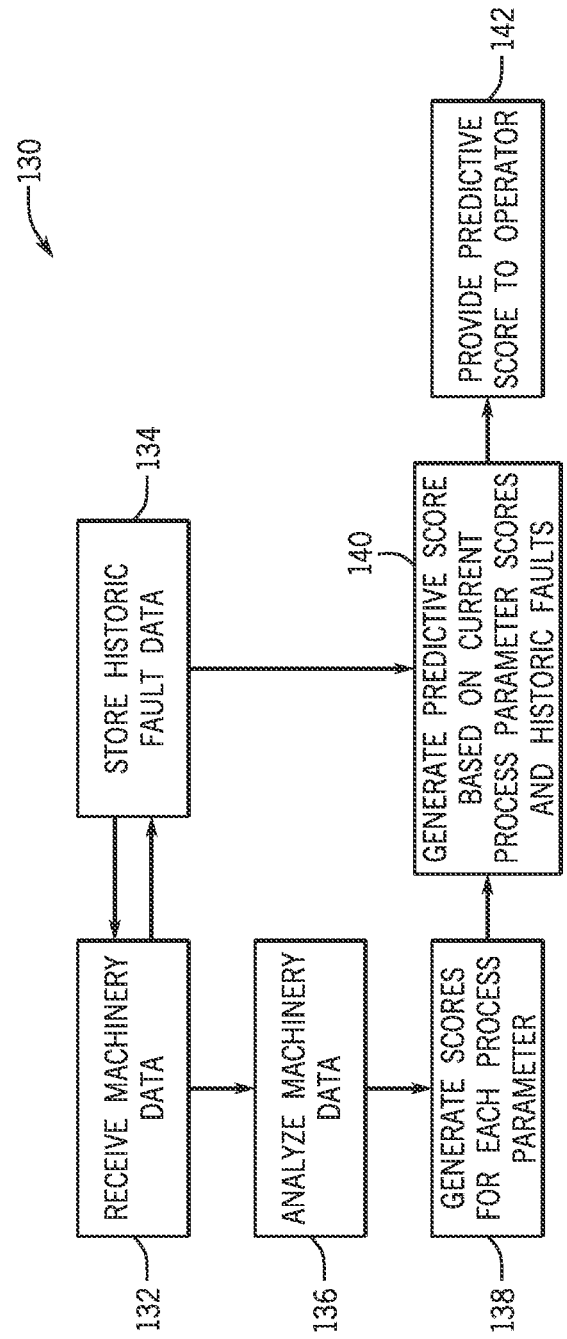
FIG. 5 is a flowchart illustrating a process for predicting system-level faults, in accordance with an embodiment.

FIG. 5 illustrates an embodiment of a process 130 for predicting a fault (e.g., a trip, shutdown, or runback) of the turbine system 38 in the industrial control system 10 using current and historic data. As discussed above, the controllers 26 monitor and collect machinery data from components of the system 10 (block 132). The data is stored in a historical data bank (e.g., a database or file on non-transitory computer-readable media) (block 134). For example, the historic data may be stored on the computer 12 hosting the HMI software 14, a computer 12 that is dedicated to storing and providing historical fault data, or any other computer 12 within the system 10. The collected data may be scanned and analyzed (block 136). This process of scanning and analyzing the collected data may occur continuously as the system 10 is in operation, or may occur at set intervals (e.g., every 1 second, 1, 10, or 30 minutes). Based upon the analyzed data and predefined relationships or correlations, the controller 26 or other processor enabled computer may derive a prediction value based upon the current data (e.g., a current process predictive score for each process parameter) (block 138). The relationships or correlations may include mathematical equations, lookup tables, software models, or a combination thereof. For example, in some embodiments, the predefined relationships (e.g., mathematical equations) may weigh the parameter data based upon the severity of a deviation from normal operating parameters.

The controller 26 or other processor enabled computer may then retrieve any stored historic data and derive a final predictive score based upon the current process predictive score and the historic data 100 (block 140). For example, the historic data 140 may include a historic fault score that may be directly applied to the current process predictive score to obtain the final score. For example, a number of times and/or severity that a parameter has deviated from normal operating parameters may be useful in predicting a future fault. The more often and/or severe the deviation, the more volatile the system. Thus, the final score may increase as the number of times and/or magnitude of severity of one or more parameters within the system 10 deviate from normal ranges increases.

In some embodiments, the final predictive score may be based upon multiple independent calculations. In other words, high predictive scores that may result from anomalies (e.g., sensor shift or other sensor problems) may be filtered out, using multiple independent means to generate verifiable scores. When the multiple independent calculations verify one another a predictive score may increase, while the score may be relatively lower in cases where the independent calculations do not verify one another.

In some embodiments, the historical data may correlate system 10 events and parameters with previous trips, shutdowns, and/or runbacks within the turbine system 38. Further, it is noted that from time to time, it may be desirable to reset the historical data, such that at least a portion of the historical data does not impact the final predictive score. In some embodiments, the operator may be enabled to reset at least a portion of the historical data, such that the historical data is not used in future predictions. In certain embodiments, the operator is enabled, through the HMI software 14, to archive or purge historical data relating to a specific parameter or component of the system 10. For example, the operator may select an option in the HMI software 14 to archive the historical data relating to the failing motor. Upon submitting the request to archive the historical data, a processor within the computer 12 may cause the failing motor's historical data to be moved to archived storage (e.g., a dedicated archival file or storage system). In some embodiments, the operator may simply request that the data be purged, thus causing the processor to delete the historical data pertaining to the failing motor. Because the historical data is very useful in predicting system-level faults, it may be beneficial to hinder unauthorized resets of the historical data. Thus, such functionality, whether in the HMI 14 or elsewhere, may include password protection algorithms to ensure that the historical data is reset only by authorized individuals.

Figure 6:
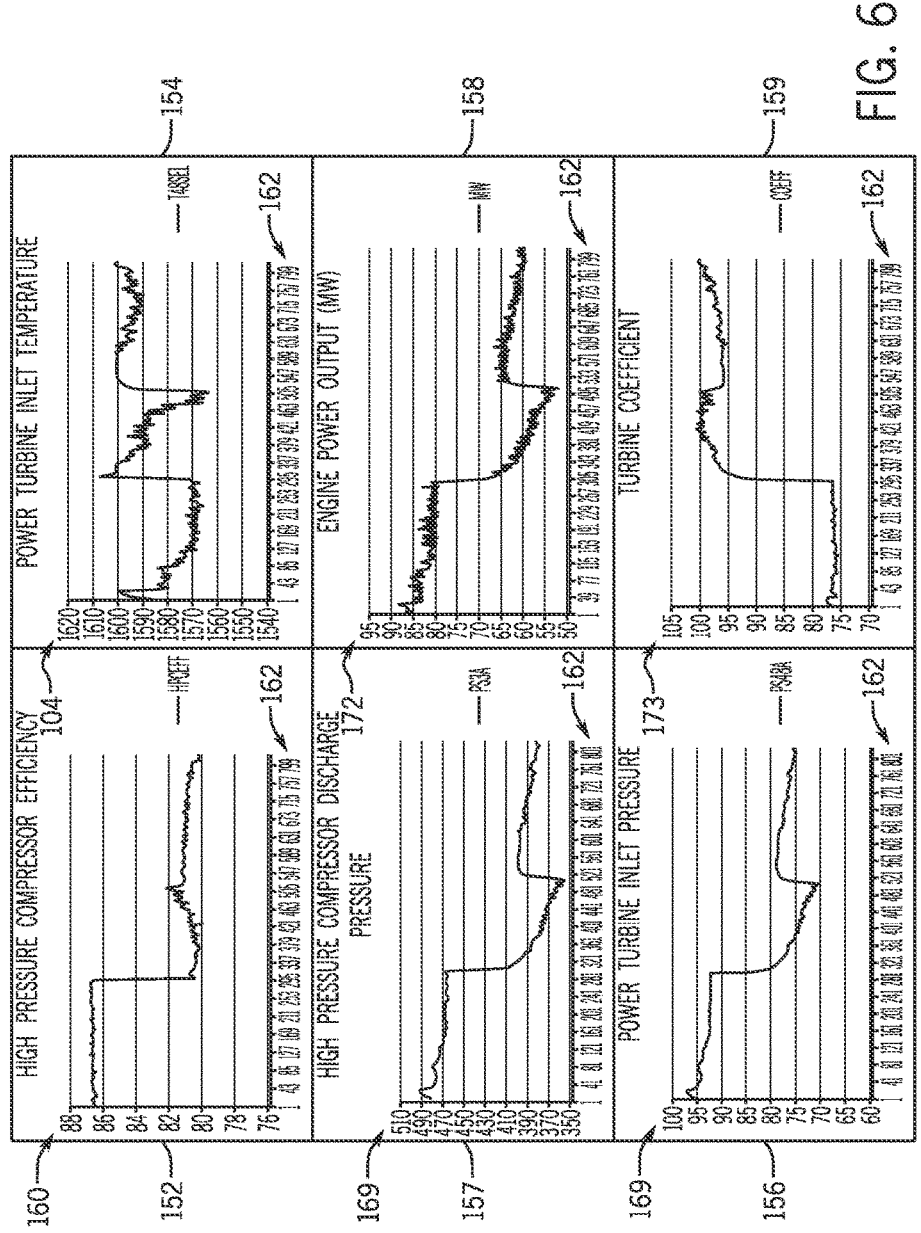
FIG. 6 is a chart-view illustrating data that may be used to predict a fault, in accordance with an embodiment.

Having now discussed certain features of the fault prediction/protection system 62, the discussion turns to certain data patterns that may be indicative of a potential fault of a turbine system 38. FIG. 6 is a chart-view illustrating trends of data that may be used to predict a fault, in accordance with an embodiment. The chart-view 150 includes six charts: a high pressure compressor efficiency chart 152, an exhaust gas temperature chart 154 (e.g., at the low-pressure turbine 98), a power turbine inlet pressure chart 156, a high pressure compressor discharge pressure 157, a power output chart 158, and turbine coefficient chart 159, which represents a measurement=15.0*(T48−1100)/PS48, where T48 is the power turbine inlet temperature and PS48 is the power turbine inlet pressure.

The high pressure compressor efficiency chart 152 illustrates a plot of compressor efficiency over time. The X-axis 160 represents a percentage of compressor efficiency and the Y-axis 162 represents time (e.g., in seconds or minutes). The inlet temperature chart 154 illustrates a plot of temperature measurements (e.g., in degrees Fahrenheit) at a power turbine inlet 164 over time 162. The power turbine inlet pressure chart 156 illustrates pressure measurements 168 over time 162. The high pressure compressor discharge pressure chart illustrates pressure measurements 169 over time 162. The power output chart 158 illustrates power output (e.g., in megawatts) 172 over time 162. The turbine coefficient chart illustrates 15.0*(T48−1100)/PS48 173 over time 162.

The pressure, temperature, efficiency and/or power output data, either alone, or relationally among one another, may be useful in predicting a fault. For example, analysis of one data measurement over time may be useful in fault prediction. In one embodiment, a spiked decrease in high-pressure compressor efficiency 160, pressure 168, and/or power output 172 breaching an established threshold (e.g., either pre-set or dynamically alterable) may indicate the likelihood of a fault. Further, a spiked increase of temperature 164 breaching an established threshold may also indicate a likelihood of a fault. In some embodiments, (e.g., in an LM6000 gas turbine by General Electric™, the threshold may be set at a 1% change or a data measurement value indicating a 1% rate of change. In embodiments where a frame engine is being monitored, the threshold may be a 0.5% change or a data measurement value indicating a 0.5% change. In other words, the threshold may vary depending on the machinery being monitored. Each piece/type of machinery being monitored may include its own threshold values (e.g., 0.5% change, 1% change, 15% change, etc.), which may or may not be the same as threshold values of other pieces/types of machinery. For example, machinery that operates at higher temperatures/pressures may experience spikes of a higher magnitude when a fault is likely to occur. The thresholds may be modified accordingly.

A combination of data measurements of time may increase the reliability of a fault prediction. For example, in certain embodiments, a ratio of temperature 164 to pressure 168 may be periodically and/or frequently calculated. As mentioned above, temperature values may spike upward and pressure values may spike downward just prior to a fault. Accordingly, these data points may diverge as the spikes occur. Thus, a quotient of the ratio of temperature 164 to pressure 168 may indicate a fault. For example, when a quotient changes beyond a certain threshold value or change percentage, the system may provide a prediction that a fault will occur. Similarly the quotient of a ratio of temperature 164 to power output 172 may be used to predict the fault in a similar fashion.

Various data measurements may also be used to validate a prediction based upon one or more indicators. For example, when the compressor efficiency 160 spikes downward, indicating that a future fault may occur, the system may validate this fault indication by looking for a temperature 164 increase, a pressure 168 decrease, and/or a power output decrease 172. In one embodiment, a ratio of exhaust gas temperatures to a power turbine inlet pressure (e.g., exhaust gas temperature−1100/power turbine inlet pressure) may be used to validate a prediction.

It is important to note that while particular relationships between data measurements have been discussed, the discussion is not intended to limit the prediction to these specific data measurement relationships. Indeed, a variety of data point patterns, data measurement ratios, etc. may be used to predict a fault. For example, ratios between values of one or more of: compressor efficiency 160, temperature 164, pressure 168, and/or power output 172 may be used (e.g., with a change threshold) to predict a fault.

Figure 7:
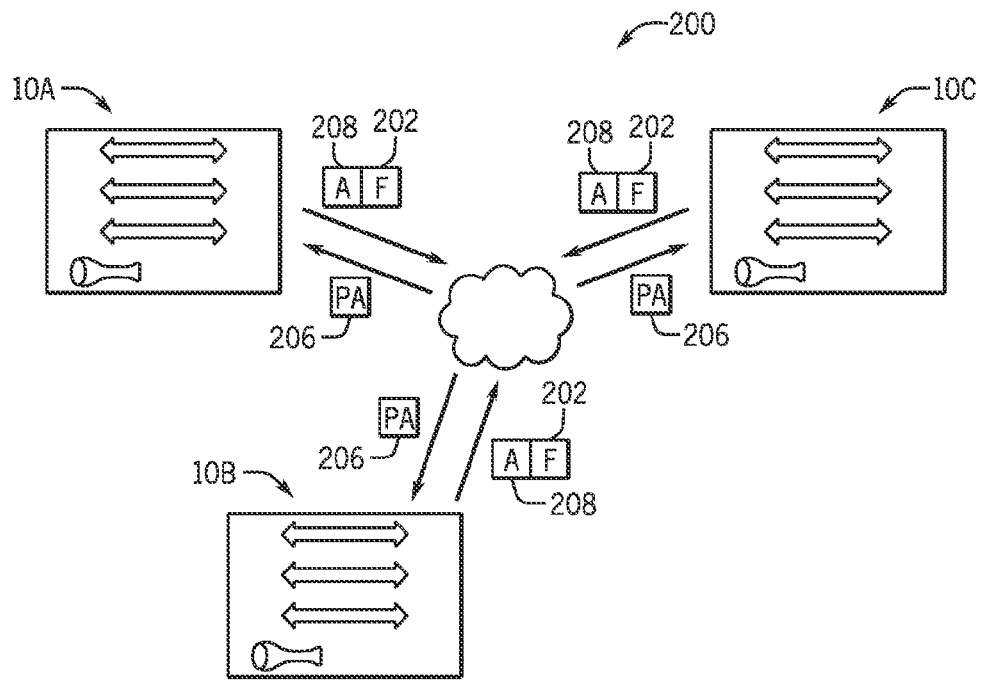
FIG. 7 is a schematic view of a cloud-based fault prediction/protection system, in accordance with an embodiment.

In some embodiments, data patterns, ratios, etc. useful for predicting potential machinery faults may be discerned from alternative control systems. FIG. 7 illustrates a schematic view of a cloud-based fault prediction/protection system 200, in accordance with an embodiment. The cloud-based fault prediction/protection system 200 may be used to communicate fault prediction correlations between independent control systems 10.

In the embodiment of FIG. 7, three independent control systems 10A, 10B, and 10C transmit fault data 202 (e.g., process parameters prior to machinery fault) to a cloud computing entity 204. The cloud-based computing entity 204 may include one or more processors that receive and analyze the fault data 202 to discern patterns among the received data. These data patterns may be useful in predicting subsequent potential faults within one of the control systems 10A, 10B, and 10C. For example, if control system 10A produces a fault, a snapshot of process data prior to the incident (e.g., 1 min, 1 hour, or 1 day, etc. prior to the incident) may be captured and communicated to the cloud 204. The cloud 204 may mine the data 202 to determine potential patterns and/or anomalies in the data prior to the fault. Based upon this mining, the cloud may broadcast a potential fault analysis 206 to the collection of independent control systems 10A, 10B, and 10C or may unicast the potential fault analysis 206 to a subset of the control systems 10A, 10B, and 10C (e.g., subscribing control systems, etc.).

In some embodiments, one or more of the control systems 10 may perform the data analysis locally. For example, upon experiencing a fault, the control system 10A may perform a local analysis of process data recorded prior to the fault. The analysis results 208 may be provided to the cloud 204, where the potential fault analysis may be broadcasted and/or unicasted as discussed above.

By incorporating this cloud-based approach, additional data points may be used in the fault prediction/protection system 62. Further, prediction confidence may be measured by determining whether the data analysis of one control system 10 is similar to the data analysis of a second control system 10. When the data analysis between control systems 10 support similar results and/or the results are repeatable at one or more of the control systems 10, the prediction confidence may increase.

By using data measurements to predict faults, corrective action may be taken prior to fault. This may result in increased system performance and reduce costs. For example, a foreign object may enter machinery causing a partial loss of airfoils. Over time, larger pieces of airfoil may be lost causing damage to the system. Using the prediction techniques described herein, a fault may be predicted prior to the larger pieces of airfoil causing damage. This may lead to reduced repair costs and increased system utilization.

Figure 8:
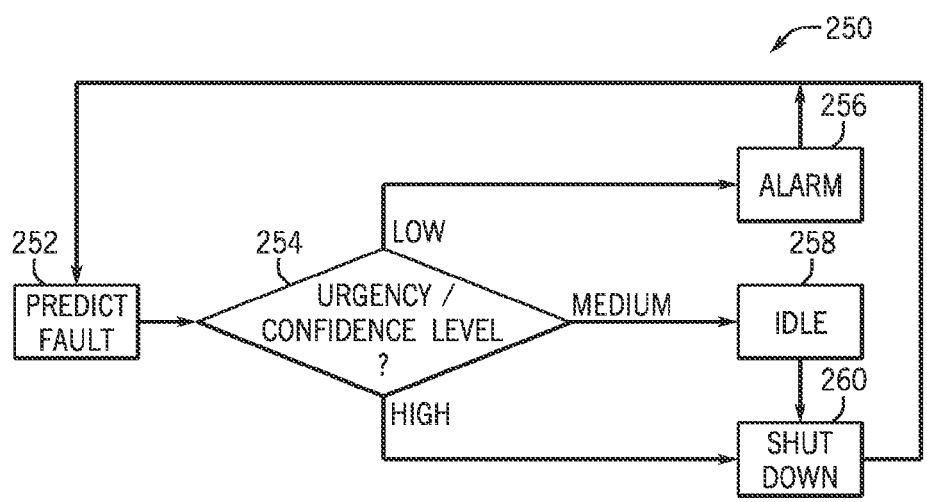
FIG. 8 is a flowchart illustrating a process for controlling the industrial control system based upon prediction confidence and/or urgency.

In some embodiments, control actions based upon fault predictions may be chosen based upon an urgency of the prediction and/or confidence level of the prediction. FIG. 8 illustrates a process 250 for controlling the machinery upon predicting a fault (block 252) prior to the occurrence of the fault. As mentioned above, in some embodiments, one or more stepped approaches may be used based upon an urgency and/or confidence level determination (e.g., decision block 254). For example, the control system 10 may determine how likely (e.g., confidence) and/or how imminent (e.g. urgency) a predicted fault may be. For example, urgency might be discerned based upon a number of data spikes and/or the magnitude of one or more data spikes. If there are data patterns suggesting that a fault may occur, but the confidence of the prediction is low or the data suggests that the fault is likely to occur a significant time in the future, the urgency level may be determined to be "low." In circumstances where there is some confidence in the prediction (e.g., a data pattern has been correlated with a fault in the past) and/or the data suggests that the fault is likely to occur in the near future, but with enough time for a machinery idle period, the urgency may be set to "medium." In situations where the confidence level is high (e.g., many similar data patterns have been correlated with a fault) and/or the data suggests that the fault is likely to occur in the near future, without enough time for a machinery idle period, the urgency may be set to "high." In alternative embodiments, an urgency level determination may not be used.

Based upon the confidence and/or urgency, a particular control action may be performed. For example, when the urgency and/or confidence level is "low," it may be desirable to provide a notification (e.g., alarm) (block 256) without altering operation of the machinery. In some embodiments, an alarm may be triggered at the HMI 14 (e.g., of FIG. 1). A remote alarm monitoring system may provide email, SMS, or other notification to operators of the control system 10 and/or manufacturers of the machinery. In some embodiments, when the confidence level is "low," a manufacturer may be notified, while a customer is not notified of the predicted fault. This may insure that the prediction is communicated, while reducing false positives that are presented to the operators.

In circumstances where the urgency and/or confidence level is "medium," the control system 10 may control the machinery to enter an idle phase (block 258). The idle phase may prepare the machinery for subsequent shut down (block 260) by, for example, reducing the operating speeds of the machinery. By tapering the speed of the machinery down incrementally, integrity of certain components (e.g., airfoils) of the machinery may be maintained. Once the end of the idle phase is reached, the machinery may be shut down (block 260).

In circumstances where the urgency and/or confidence level is "high," the control system 10 may control the machinery to shut down (block 260) without entering the idle phase (block 258). This may help with the rapid shutdown of the machinery to help avoid a fault that is rapidly approaching.

In embodiments where no urgency level determination is used, any combination of the control actions may be performed, as desired by an operator and/or manufacturer of the control system 10. For example, in such embodiments, the control system may be designed to alarm (block 256) and/or shutting down the machinery (block 260) upon predicting a fault.

When determining actions for potential faults within the control systems 10, the control systems 10 may use the prediction confidence to determine a particular protective action. For example, for a prediction analysis with a lower confidence level, the control system 10 may merely provide an alert to an operator of the control system 10, whereas the control system 10 may alter operation of turbine system 38 when a fault is predicted using a prediction analysis with a high level of confidence.

Technical effects of the invention include a control system that is able to prevent turbine faults by predicting faults prior to their occurrence. Based upon this prediction, operators of the control system may be alerted of the potential issue and/or the control system may automatically affect a change of operation within the control system. By preemptively notifying and avoiding turbine faults, repair and associated costs may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
sensors that capture one or more data measurements of machinery comprising a gas turbine having at least an inlet and a high pressure compressor, the one or more data measurements comprising: an efficiency of the high pressure compressor, a temperature at the inlet, a pressure at the inlet, a discharge pressure of the high pressure compressor, a power output of the gas turbine, or any combination thereof; and
a protection monitoring system, comprising at least one processor configured to:
accumulate the one or more data measurements and determine a trend of the one or more measurements of the machinery;
analyze the trend of the one or more data measurements of the machinery to identify one or more patterns indicative of a potential future fault within the machinery in the trend; and
generate a graphical user interface that provides a graphical indication of a fault prediction, generate and present an alarm that provides an indication of the fault prediction, generate and present an alert that provides an indication of the fault prediction, control, via a controller, the machinery by performing a tapered deceleration of machinery operating speeds or shut down of the machinery in response to the fault prediction, prior to a fault in the machinery, or any combination thereof based upon the identified one or more patterns;
wherein:
the one or more data measurements comprise at least the temperature at the inlet and the pressure at the inlet, and the analysis comprises: determining a quotient of a ratio of the temperature at the inlet to the pressure at the inlet, comparing the quotient with a predetermined threshold value, and when the quotient breaches the predetermined threshold value, predict a fault; or
the one or more data measurements comprise at least the efficiency of the high pressure compressor and the analysis comprises: identifying a spiked decrease in the efficiency of the high pressure compressor, and upon identifying the spiked decrease, predict a fault.

2. The system of claim 1, wherein the processor is configured to calculate a ratio of trends of at least two data measurements.

3. The system of claim 2, wherein a quotient of the ratio is used in the analysis.

4. The system of claim 1, comprising a controller configured to invoke one or more control actions comprising: generation of the graphical user interface, generation and presentation of the alarm, generation and presentation of the alert, the control of the machinery, or any combination thereof based upon the fault prediction.

5. The system of claim 1, where in the processor is configured to determine a level of confidence of the fault prediction based upon a frequency of prior occurrences of the one or more patterns being attributed to a subsequent fault.

6. The system of claim 1, wherein the processor is configured to determine a level of urgency related to the fault prediction.

7. The system of claim 1, wherein the system comprises:
a plurality of independent industrial control systems; and
a cloud-computing environment configured to:
receive data measurements and fault data from at least one of the independent industrial control systems;
analyze the data measurements of the at least one independent industrial control systems to associate at least one data pattern of the data measurements with the future potential fault; and
provide the at least one data pattern to the other independent control systems, such that the other independent control systems are aware that the at least one data pattern is associated with the future potential fault.

8. A tangible, non-transitory, machine-readable medium, comprising instructions to:
obtain data measurement trends related to one or more characteristics of a piece of machinery, wherein the machinery comprises a gas turbine having at least an inlet and a high pressure compressor, and wherein the one or more characteristics comprise: an efficiency of the high pressure compressor, a temperature at the inlet, a pressure at the inlet, a discharge pressure of the high pressure compressor, a power output of the gas turbine, or any combination thereof and the one or more characteristics are captured via one or more data sensors associated with the piece of machinery and are accumulated to determine the data measurement trends;
analyze the data measurement trends to identify one or more patterns indicative of a potential future fault within the machinery; and
generate a graphical user interface that provides a graphical indication of a fault prediction, generate and present an alarm that provides an indication of the fault prediction, generate and present an alert that provides an indication of the fault prediction, control, via a controller, the piece of machinery by performing a tapered deceleration of machinery operating speeds or shut down of the machinery in response to the fault prediction, prior to a fault in the piece of machinery, or any combination thereof based upon the identified one or more patterns;
wherein:
the one or more characteristics comprise at least the temperature at the inlet and the pressure at the inlet, and the analysis comprises: determining a quotient of a ratio of the temperature at the inlet to the pressure at the inlet, comparing the quotient with a predetermined threshold value, and when the quotient breaches the predetermined threshold value, predict a fault; or
the one or more characteristics comprise at least the efficiency of the high pressure compressor and the analysis comprises: identifying a spiked decrease in the efficiency of the high pressure compressor, and upon identifying the spiked decrease, predict a fault.

9. The tangible, non-transitory, machine-readable medium of claim 8, comprising instructions to:
receive historic fault data; and
identify the one or more patterns indicative of a potential future fault based at least in part on the historic fault data.

10. The tangible, non-transitory, machine-readable medium of claim 8, wherein the characteristics of the piece of machinery comprise: the efficiency of the high pressure compressor, a temperate at a low-pressure inlet, a pressure at a burner inlet, or power output of the gas turbine.

11. The tangible, non-transitory, machine-readable medium of claim 8, wherein the instructions to analyze the data measurement trends to identify one or more patterns comprise instructions to: identify data spikes in the data measurement trends over a particular threshold of change.

12. The tangible, non-transitory, machine-readable medium of claim 8, wherein the particular threshold of change is larger than 0.5%.

13. A method, comprising:
predicting, via a computer processor, a potential machinery fault by:
obtaining data measurement trends related to one or more characteristics of the machinery, wherein the machinery comprises a gas turbine having at least an inlet and a high pressure compressor, and wherein the one or more characteristics comprise: an efficiency of the high pressure compressor, a temperature at the inlet, a pressure at the inlet, a discharge pressure of the high pressure compressor, a power output of the gas turbine, or any combination thereof and the one or more characteristics are captured via one or more data sensors associated with the piece of machinery and are accumulated to determine the data measurement trends;
analyzing the data measurement trends to identify one or more patterns indicative of a potential future fault within the machinery; and
generating a graphical user interface that provides a graphical indication of providing a fault prediction, generating and presenting an alarm that provides an indication of the fault prediction, generating and presenting an alert that provides an indication of the fault prediction, controlling, via a controller, the machinery by performing a tapered deceleration of machinery operating speeds or shut down of the machinery in response to the fault prediction, prior to a fault in the machinery, or any combination thereof based upon the identified one or more patterns;
wherein:
the one or more characteristics comprise at least the temperature at the inlet and the pressure at the inlet, and the analysis comprises: determining a quotient of a ratio of the temperature at the inlet to the pressure at the inlet, comparing the quotient with a predetermined threshold value, and when the quotient breaches the predetermined threshold value, predict a fault; or
the one or more characteristics comprise at least the efficiency of the high pressure compressor and the analysis comprises: identifying a spiked decrease in the efficiency of the high pressure compressor, and upon identifying the spiked decrease, predict a fault.

14. The method of claim 13, comprising:
determining, via the computer processor, a confidence level of the fault prediction; and selecting a particular control action from a set of control actions comprising: generation of the graphical user interface, generation and presentation of the alarm, generation and presentation of the alert, the control of the machinery, or any combination thereof based upon the confidence level of the fault prediction.

15. The method of claim 13, comprising:

determining, via the computer processor, an urgency level of the fault prediction; and selecting a particular control action from a set of control actions comprising: generation of the graphical user interface, generation and presentation of the alarm, generation and presentation of the alert, the control of the machinery, or any combination thereof based upon the urgency level of the fault prediction.

16. The method of claim 13, wherein the one or more characteristics comprise: the efficiency of the high pressure compressor, a temperate at a low-pressure inlet, a pressure at a burner inlet, a power output of the gas turbine, or any combination thereof.

17. The method of claim 13, comprising:

calculating a ratio of two or more of the one or more characteristics and using the ratio to identify the one or more patterns indicative of the potential future fault.

* * * * *